(12) United States Patent
Swab

(10) Patent No.: US 12,270,599 B2
(45) Date of Patent: Apr. 8, 2025

(54) TRANSPORT REFRIGERATION UNIT

(71) Applicant: Carrier Corporation, Palm Beach Gardens, FL (US)

(72) Inventor: Michael Thomas Swab, Acworth, GA (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 527 days.

(21) Appl. No.: 15/733,991

(22) PCT Filed: Aug. 1, 2019

(86) PCT No.: PCT/US2019/044643
§ 371 (c)(1),
(2) Date: Dec. 1, 2020

(87) PCT Pub. No.: WO2020/033230
PCT Pub. Date: Feb. 13, 2020

(65) Prior Publication Data
US 2021/0215417 A1    Jul. 15, 2021

Related U.S. Application Data

(60) Provisional application No. 62/714,988, filed on Aug. 6, 2018.

(51) Int. Cl.
*F25D 29/00* (2006.01)
*B60H 1/00* (2006.01)
(Continued)

(52) U.S. Cl.
CPC ......... *F25D 29/003* (2013.01); *B60H 1/3232* (2013.01); *B60H 1/00278* (2013.01);
(Continued)

(58) Field of Classification Search
CPC .... F25B 29/003; F25B 6/04; F25B 2327/001; B60H 1/3232; B60H 1/00278; B60H 1/00428; B60H 2001/224
See application file for complete search history.

(56) References Cited

U.S. PATENT DOCUMENTS 9,429,018 B2    8/2016  Zachary et al.
9,464,839 B2   10/2016  Rusignuolo et al.
(Continued)

FOREIGN PATENT DOCUMENTS

CN    107719067 A    2/2018
CN    108116192 A    6/2018
(Continued)

OTHER PUBLICATIONS

Carrier Transicold. "Carrier Transicold Marks 10-Year Anniversary of Vector Trailer Platform". Mar. 31, 2016. 3 pages.
(Continued)

*Primary Examiner* — Tavia Sullens
(74) *Attorney, Agent, or Firm* — CANTOR COLBURN LLP

(57) ABSTRACT

A power supply unit (14) provided with a transport refrigeration unit (12) includes an insulated battery box (60), a heat exchanger (64), and a battery (62). The heat exchanger (64) is disposed within the insulated battery box (60). The heat exchanger (64) has a heat exchanger inlet (80) that is fluidly connected to a compressor outlet (42) and a heat exchanger outlet (82) that is fluidly connected to a refrigeration unit heat exchanger inlet (50). The battery (62) is disposed within the insulated battery box (60).

8 Claims, 1 Drawing Sheet

(51) Int. Cl.
*B60H 1/32* (2006.01)
*F25B 6/04* (2006.01)

(52) U.S. Cl.
CPC ............ *B60H 1/00428* (2013.01); *F25B 6/04* (2013.01); *F25B 2327/001* (2013.01)

(56) References Cited

U.S. PATENT DOCUMENTS

| | | |
|---|---|---|
| 9,827,824 B2 | 11/2017 | Enomoto et al. |
| 9,975,403 B2 | 5/2018 | Rusignuolo et al. |
| 2006/0042284 A1 | 3/2006 | Heberle et al. |
| 2014/0137590 A1 | 5/2014 | Chopko et al. |
| 2014/0208789 A1* | 7/2014 | Lombardo ......... B60H 1/00278 62/238.1 |
| 2014/0223925 A1 | 8/2014 | Kawakami et al. |
| 2015/0128626 A1 | 5/2015 | Guigou et al. |
| 2015/0168032 A1 | 6/2015 | Steele |
| 2015/0263363 A1 | 9/2015 | Haase et al. |
| 2016/0107507 A1* | 4/2016 | Johnston ............ B60H 1/00278 62/160 |
| 2018/0056769 A1 | 3/2018 | Kerspe et al. |
| 2018/0111441 A1 | 4/2018 | Menard et al. |

FOREIGN PATENT DOCUMENTS

| | | | |
|---|---|---|---|
| DE | 102016108571 A1 | 11/2016 | |
| JP | 2007179976 A | 7/2007 | |
| JP | 2007179991 A | 7/2007 | |
| KR | 20170139204 A * | 12/2017 | |
| WO | 2012021104 A1 | 2/2012 | |
| WO | WO-2013072754 A1 * | 5/2013 | ......... B60H 1/00278 |
| WO | 2017218906 A1 | 12/2017 | |

OTHER PUBLICATIONS

International Search Report for International Application No. PCT/US2019/044643, International Filing Date Aug. 1, 2019, Date of Mailing Oct. 9, 2019, 7 pages.

Written Opinion for International Application No. PCT/US2019/044643, International Filing Date Aug. 1, 2019, Date of Mailing Oct. 9, 2019, 7 pages.

* cited by examiner

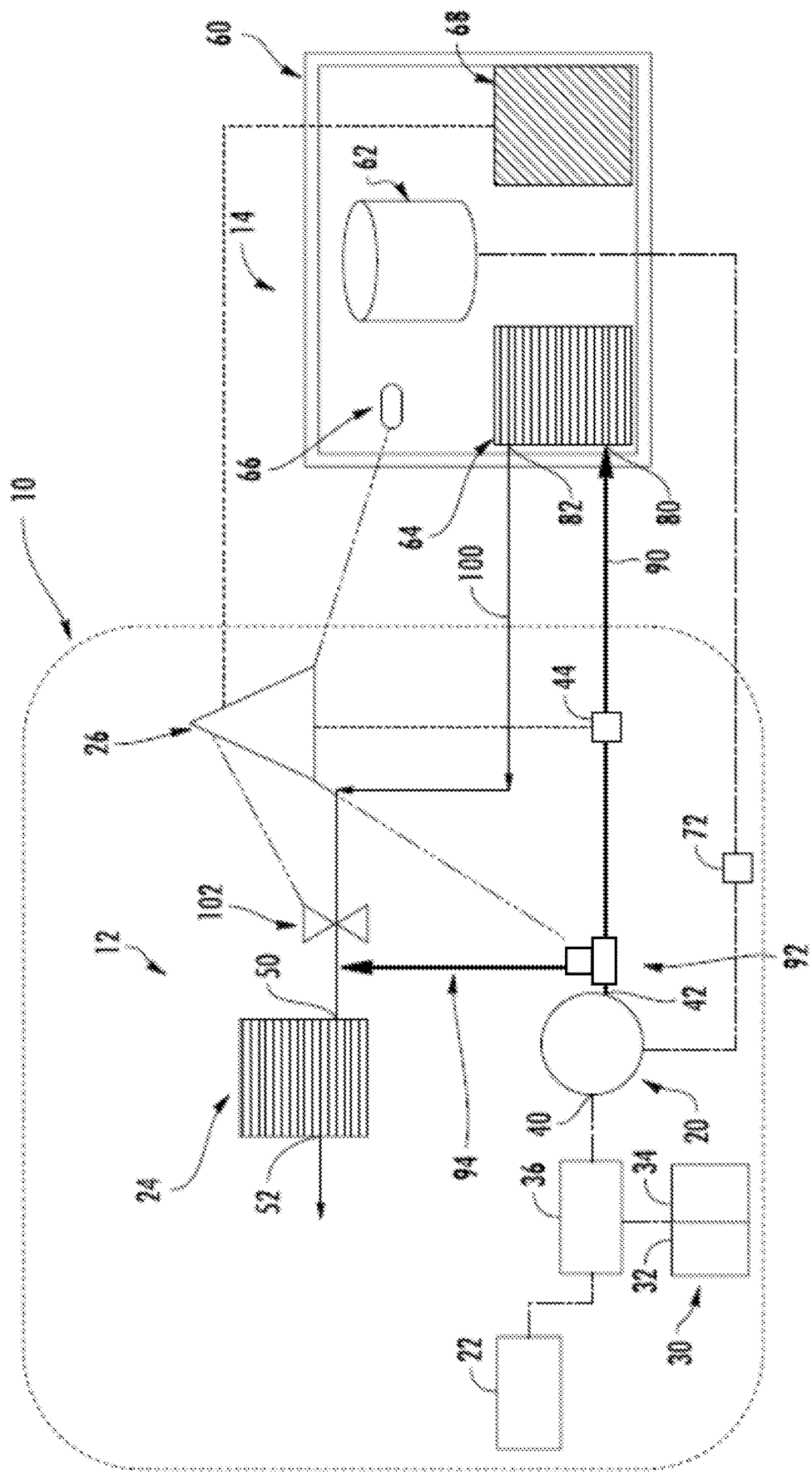

TRANSPORT REFRIGERATION UNIT

CROSS REFERENCE TO RELATED APPLICATIONS

This is a U.S. National Stage of Application No. PCT/US2019/044643, filed Aug. 1, 2019, which claims priority to U.S. Provisional Application No. 62/714,988, filed Aug. 6, 2018, the disclosures of which are incorporated herein by reference in their entireties.

BACKGROUND

A transport refrigeration unit may be provided with a truck, a trailer or other mobile container and is arranged to control the temperature and/or humidity within the container. The transport refrigeration unit may include a generator that may power various components and may include a battery for storing energy produced by the generator.

SUMMARY

Disclosed is a transport refrigeration unit that includes a refrigeration unit and a power supply unit. The refrigeration unit includes a compressor having a compressor outlet, the compressor being at least partially powered by a power pack, and a first heat exchanger having a first heat exchanger inlet and a first heat exchanger outlet. The power supply unit includes a second heat exchanger and a battery. The second heat exchanger has a second heat exchanger inlet that is fluidly connected to the compressor outlet and a second heat exchanger outlet that is fluidly connected to the first heat exchanger inlet. The battery is arranged to provide electric power to the compressor.

Also disclosed is a power supply unit provided with a transport refrigeration unit that includes an insulated battery box, a heat exchanger, and a battery. The heat exchanger is disposed within the insulated battery box. The heat exchanger has a heat exchanger inlet that is fluidly connected to a compressor outlet and a heat exchanger outlet that is fluidly connected to a refrigeration unit heat exchanger inlet. The battery is disposed within the insulated battery box.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the present disclosure are apparent from the following detailed description taken in conjunction with the accompanying drawings in which:

FIG. 1 is a schematic view of a transport refrigeration unit having a power supply unit.

DETAILED DESCRIPTION

Referring to the FIGURE, a transport refrigeration unit 10 is schematically illustrated. The transport refrigeration unit 10 includes a refrigeration unit 12 and a power supply unit 14. The transport refrigeration unit 10 may be provided with a battery having an electrolyte that may not produce electricity should a battery temperature fall below a predetermined temperature and remain in a storage mode until the battery is heated to the predetermined temperature. Commonly an electric heater may be provided to increase or maintain the battery temperature proximate the predetermined temperature, however a substantial amount of time may be required to heat the battery to the predetermined temperature and the heater may use a substantial amount of energy to operate the electric heater. The operation of the electric heater may reduce the runtime and efficiency of the overall transport refrigeration unit.

The transport refrigeration unit 10 of the present disclosure is provided with a mechanism that utilizes waste heat generated by the refrigeration unit 12 to heat or maintain a temperature of a battery to conserve electric power. The refrigeration unit 12 includes a compressor 20, a fan 22, a first heat exchanger 24, and a controller 26.

The compressor 20 and the fan 22 may be at least partially powered by a power pack 30. The power pack 30 may include an engine 32, such as an internal combustion engine, and a generator 34 that is driven by the engine 32. The generator 34 may provide power through a distribution bus 36 to other components of the transport refrigeration unit 10 such as the fan 22 and the compressor 20. The generator 34 may also provide power through the distribution bus 36 to components of the power supply unit 14. The power pack 30 may be integrated with the refrigeration unit 12 in some embodiments.

The compressor 20 includes a compressor inlet 40 and a compressor outlet 42. The compressor inlet 40 is arranged to receive refrigerant or a fluid flow from the first heat exchanger 24 or from another source. The compressor outlet 42 is arranged to deliver or discharge refrigerant towards the power supply unit 14, as will be discussed in greater detail later. A temperature sensor 44 may be positioned or arranged to provide a signal to the controller 26 indicative of a fluid temperature (e.g. compressor discharge temperature) of a fluid that is delivered to or discharged towards the power supply unit 14.

The first heat exchanger 24 may be arranged as a condenser having at least one condenser coil. The first heat exchanger 24 includes a first heat exchanger inlet 50 and a first heat exchanger outlet 52. The first heat exchanger inlet 50 is arranged to receive refrigerant or fluid flow that is routed through the power supply unit 14. The first heat exchanger outlet 52 is arranged to provide refrigerant or a fluid flow to the refrigeration system that is fluidly connected to the refrigeration unit 12. In at least one embodiment, the first heat exchanger 24 includes a discharge outlet that is fluidly connected to the compressor inlet 40.

The controller 26 is in communication with various components of the refrigeration unit 12 and the power supply unit 14. The controller 26 may be provided with the refrigeration unit 12 or may be provided as a separate standalone controller.

The power supply unit 14 includes an insulated container 60, a battery 62, a second heat exchanger 64, a temperature sensor 66, and an electric heater 68.

The insulated container 60 may be an insulated battery box. The battery 62, the second heat exchanger 64, the temperature sensor 66, and the electric heater 68 may be disposed within or positioned within the insulated battery box.

The battery 62 may be a battery having a salt-based electrolyte. For example, the battery 62 may be a sodium-sulfur battery, another salt battery, or a battery optimized for performance at elevated temperatures, that is disposed within the insulated battery box. The battery 62 is arranged to provide electric power to the compressor 20 or other components of the transport refrigeration unit 10. In at least one embodiment, the battery 62 may be arranged to receive or store electric power provided by the generator 34. The power from the battery 62 may pass through a DC-AC inverter 72 should the transport refrigeration unit 10 be AC power based.

The battery 62 may have an operating temperature range of approximately 130° F. to 500° F. The battery 62 may be arranged to provide electrical power while the battery 62 is within the operating temperature range.

The second heat exchanger 64 may be a second condenser having at least one coil. The second heat exchanger 64 includes a second heat exchanger inlet 80 and a second heat exchanger outlet 82.

The second heat exchanger inlet 80 is fluidly connected to the compressor outlet 42 through a first conduit 90 having a first valve 92. The first conduit 90 extends between the compressor outlet 42 and the second heat exchanger inlet 80. The first valve 92 is connected to the first conduit 90 and is arranged to selectively facilitate fluid communication between the compressor outlet 42 and the second heat exchanger inlet 80.

The first valve 92 is in communication with the controller 26. The first valve 92 may be a three-way valve that is movable between a first open position, a second open position, and a closed position. The first open position facilitates a fluid flow through the first conduit 90 between the compressor outlet 42 and the second heat exchanger inlet 80. The second open position inhibits fluid flow through the first conduit 90 between the compressor outlet 42 and the second heat exchanger inlet 80. The second open position directs fluid flow from the first conduit 90 to the first heat exchanger inlet 50 through a bypass line 94.

The second heat exchanger outlet 82 is fluidly connected to the first heat exchanger inlet 50 through a second conduit 100 having a second valve 102. The second conduit 100 extends between the second heat exchanger outlet 82 and the first heat exchanger inlet 50. The second valve 102 is connected to the second conduit 100 and is arranged to selectively facilitate a fluid flow between the second heat exchanger outlet 82 and the first heat exchanger inlet 50. The bypass line 94 extends between the first valve 92 and the second conduit 100.

The second valve 102 is in communication with the controller 26. The second valve 102 may be a cutoff valve that is movable between an open position and a closed position. The open position facilitates fluid flow through the second conduit 100 between the second heat exchanger outlet 82 and the first heat exchanger inlet 50. The closed position inhibits fluid flow through the second conduit 100 between the second heat exchanger outlet 82 and the first heat exchanger inlet 50.

The temperature sensor 66 is disposed within the insulated battery box. The temperature sensor 66 is arranged to provide a signal indicative of a temperature of the battery 62, e.g. battery temperature. The temperature sensor 66 may be disposed on, disposed proximate, or engage the battery 62.

The electric heater 68 is disposed within insulated battery box. The electric heater 68 may be powered by the refrigeration unit 12 through the distribution bus 36, from a separate power source that is separate from the refrigeration unit 12 and the power supply unit 14, or may be powered by the generator 34. The electric heater 68 is in communication with the controller 26.

The controller 26 is provided with input communication channels that are arranged to receive: 1) the signal indicative of a fluid temperature of a fluid within the first conduit 90 from the temperature sensor 44; and 2) the signal indicative of the battery temperature from the temperature sensor 66.

The controller 26 is provided with output communication channels that are arranged to provide signals or commands to: 1) the first valve 92 associated with the first conduit 90; 2) the second valve 102 associated with the second conduit 100; and 3) the electric heater 68.

The controller 26 is provided with at least one processor that is programmed to perform control logic, control algorithms, or functions to command the electric heater 68, the first valve 92, and the second valve 102 to perform various functions.

The controller 26 is programmed to, command the first valve 92 to move towards the first open position and command the second valve 102 to move towards the open position, responsive to the signal provided by the temperature sensor 66 being indicative of the battery temperature being less than a threshold. The threshold may be a battery temperature that is less than the operating temperature of the battery 62 or proximate a lower operating temperature of the battery 62. The opening of the first valve 92 and the second valve 102 facilitates a fluid flow between the compressor 20 and the second heat exchanger 64 while the transport refrigeration unit 10 is operated.

The command from the controller 26 is a command for a fluid flow through the second heat exchanger 64 such that waste heat from the second heat exchanger 64 heats the battery 62. The fluid flow from the compressor outlet 42 that flows through the second heat exchanger 64 results in the second heat exchanger 64 generating waste heat that heats the battery 62 or the interior of the insulated battery box. The heating of the battery 62 by the waste heat of the second heat exchanger 64 reduces power consumption as well as improves the efficiency of the refrigeration unit 12 by not consistently using the electric heater 68 to heat the battery 62.

The controller 26 is programmed to command the electric heater 68 to operate to heat the battery 62 or the interior of insulated battery box, responsive to the signal provided by at least one of the temperature sensor 44 being indicative of the compressor discharge temperature being less than a threshold and/or the signal provided by the temperature sensor 66 being indicative of the battery temperature being less than a threshold. In such an arrangement, the battery 62 and/or the interior of the insulated battery box may be simultaneously heated by the waste heat from the second heat exchanger 64 and by the electric heater 68. The combination of heating of the battery 62 by waste heat and the electric heater 68 reduces the total power consumption used by the electric heater 68 by reducing the total on time of the electric heater 68 therefore, improving the overall efficiency of the refrigeration unit 12.

The controller 26 is programmed to command the first valve 92 to move towards at least one of the closed position and/or the second open position and command the second valve 102 to move towards the closed position, responsive to the signal provided by the temperature sensor 66 being indicative of the battery temperature being greater than or equal to a threshold. This facilitates the compressor outlet 42 being fluidly connected to the first heat exchanger inlet 50 through the bypass line 94 to return to transport refrigeration unit 10 to a mode in which the power supply unit 14 is not heated by waste heat.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description.

What is claimed is:

1. A transport refrigeration unit, comprising:
   a refrigeration unit, comprising:
      a compressor having a compressor outlet, the compressor being at least partially powered by a power pack, and
      a first heat exchanger having a first heat exchanger inlet and a first heat exchanger outlet; and
   a power supply unit, comprising:
      a second heat exchanger having a second heat exchanger inlet that is fluidly connected to the compressor outlet and a second heat exchanger outlet that is fluidly connected to the first heat exchanger inlet, and
      a battery arranged to provide electric power to the compressor;
      an insulated battery box, wherein the second heat exchanger and the battery are disposed within the insulated battery box;
      the insulated battery box being an insulated container distinct from the refrigeration unit;
      wherein the second heat exchanger is configured to receive fluid flow from the compressor outlet such that the second heat exchanger generates waste heat that heats the interior of the insulated battery box;
   the transport refrigeration unit further including:
      a first conduit directly connecting the compressor outlet and the second heat exchanger inlet and a first valve positioned in the first conduit;
      a second conduit extending between the second heat exchanger outlet and the first heat exchanger inlet;
      a second valve connected to the second conduit, the second valve movable between an open position that facilitates fluid flow through the second conduit and a closed position that inhibits fluid flow through the second conduit;
      the second heat exchanger outlet connected directly to the first heat exchanger inlet through the second conduit and the second valve.

2. The transport refrigeration unit of claim 1, wherein the power supply unit further comprises:
   an electric heater disposed within the insulated battery box.

3. The transport refrigeration unit of claim 2, wherein the power supply unit further comprises:
   a temperature sensor disposed within the insulated battery box and arranged to provide a signal indicative of a battery temperature.

4. The transport refrigeration unit of claim 3, further comprising a controller arranged to receive the signal.

5. The transport refrigeration unit of claim 4, wherein the controller is programmed to command the electric heater to operate, responsive to the signal being indicative of the battery temperature being less than a threshold.

6. The transport refrigeration unit of claim 1, wherein
   the first valve is movable between a first open position that facilitates a fluid flow through the first conduit, a second open position that directs fluid flow from the first conduit to the second conduit through a bypass line, and a closed position that inhibits fluid flow through the first conduit.

7. The transport refrigeration unit of claim 6, wherein the controller is programmed to command at least one of the first valve to move towards the first open position or the second valve to move towards the open position, responsive to the signal being indicative of the battery temperature being less than a threshold.

8. The transport refrigeration unit of claim 1, wherein the second heat exchanger is a refrigerant to air heat exchanger.

* * * * *